United States Patent
Hagiwara et al.

(10) Patent No.: US 6,816,611 B1
(45) Date of Patent: Nov. 9, 2004

(54) IMAGE PROCESSING METHOD, FACIAL REGION EXTRACTION METHOD, AND APPARATUS THEREFOR

(75) Inventors: Masafumi Hagiwara, Sagamihara (JP); Ken Sakakibara, Tokyo (JP); Toshihiro Kimura, Machida (JP); Yoshihisa Tadokoro, Yokohama (JP); Masami Kato, Sagamihara (JP); Yuuki Yokoo, Hyogo-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,818

(22) Filed: May 26, 1999

(30) Foreign Application Priority Data

May 29, 1998 (JP) .......................................... 10-150230
Feb. 25, 1999 (JP) .......................................... 11-049107

(51) Int. Cl.[7] .............................................. G06K 9/00
(52) U.S. Cl. .................. 382/165; 382/168; 358/522; 340/5.53; 702/180
(58) Field of Search ................................ 382/117, 118, 382/164, 165, 167, 168, 171; 348/77, 143, 156; 340/5.53, 5.83, 672; 713/186; 707/6; 902/3, 6; 358/520, 521, 522, 453; 702/180

(56) References Cited

U.S. PATENT DOCUMENTS

| | | | | |
|---|---|---|---|---|
| 5,309,228 A | * | 5/1994 | Nakamura | 358/500 |
| 5,410,609 A | * | 4/1995 | Kado et al. | 382/2 |
| 5,430,809 A | * | 7/1995 | Tomitaka | 382/173 |
| 5,615,324 A | * | 3/1997 | Kuboyama | 395/141 |
| 5,629,752 A | * | 5/1997 | Kinjo | 355/35 |
| 5,748,776 A | * | 5/1998 | Yoshida | 382/195 |
| 5,781,650 A | * | 7/1998 | Lobo et al. | 382/118 |
| 5,781,665 A | * | 7/1998 | Cullen et al. | 382/254 |
| 5,787,186 A | * | 7/1998 | Schroeder | 382/115 |
| 5,802,361 A | * | 9/1998 | Wang et al. | 382/217 |
| 5,815,198 A | * | 9/1998 | Vachtsevanos et al. | 348/88 |
| 5,850,463 A | * | 12/1998 | Horii | 382/118 |
| 6,188,777 B1 | * | 2/2001 | Darrell et al. | 382/103 |
| 6,292,574 B1 | * | 9/2001 | Schildkraut et al. | 382/117 |
| 6,332,033 B1 | * | 12/2001 | Qian | 382/124 |
| 6,332,038 B1 | * | 12/2001 | Funayama et al. | 382/190 |
| 6,434,271 B1 | * | 8/2002 | Christian et al. | 382/194 |

* cited by examiner

*Primary Examiner*—Samir Ahmed
*Assistant Examiner*—Anand Bhatnagar
(74) *Attorney, Agent, or Firm*—Fitzpatrick, Cella, Harper & Scinto

(57) ABSTRACT

A flesh tone region detection processor (12) detects a flesh tone region from a color still image, and a projective distribution generator (13) generates the projective distribution of the detected flesh tone region. A facial region search processor (14) searches the projective distribution for a parabola using, e.g., a genetic algorithm, and extracts a facial region candidate from the position of the found parabola. A knowledge processor (15) checks based on the aspect ratio of the region, matching with facial patterns prepared in advance, or the presence/absence of a region corresponding to hair if the extracted facial region candidate is a facial region. The user can set the processing time, the number of persons to be detected, and the face area ratio as a search end condition.

17 Claims, 21 Drawing Sheets

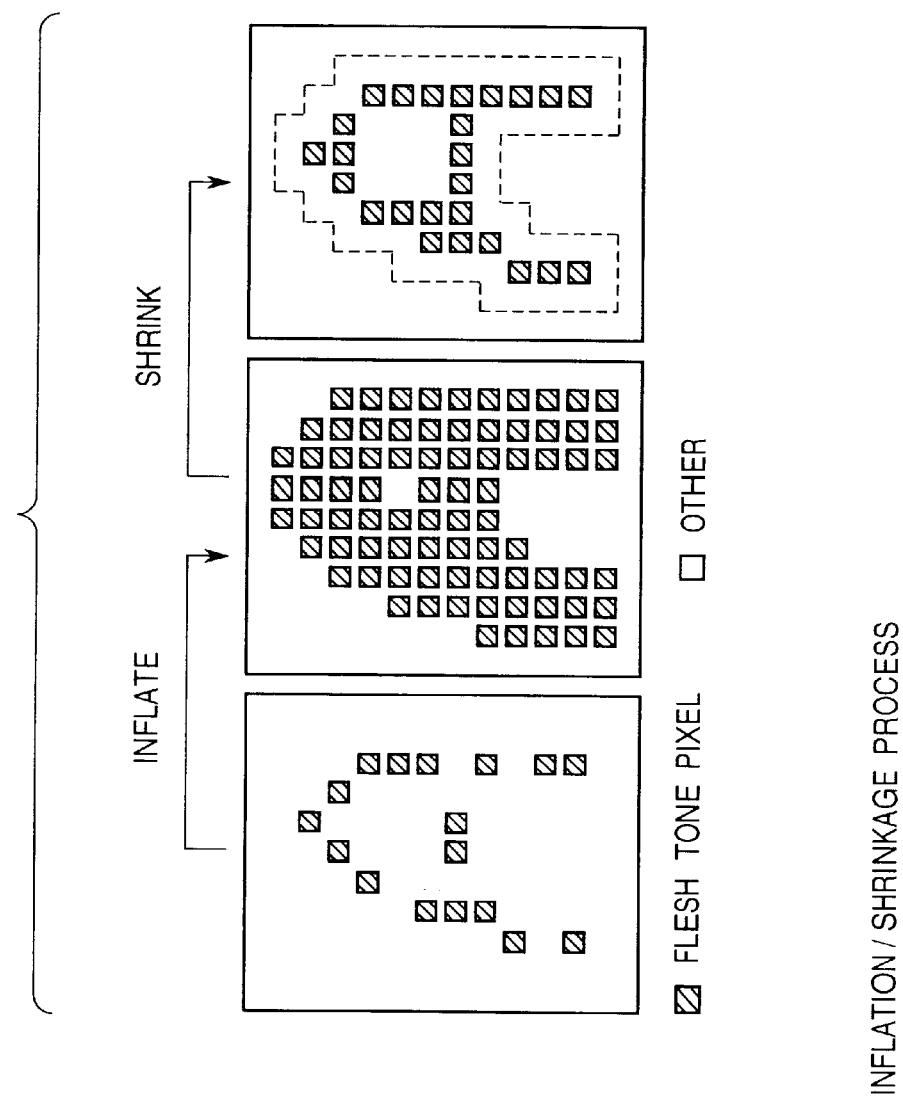
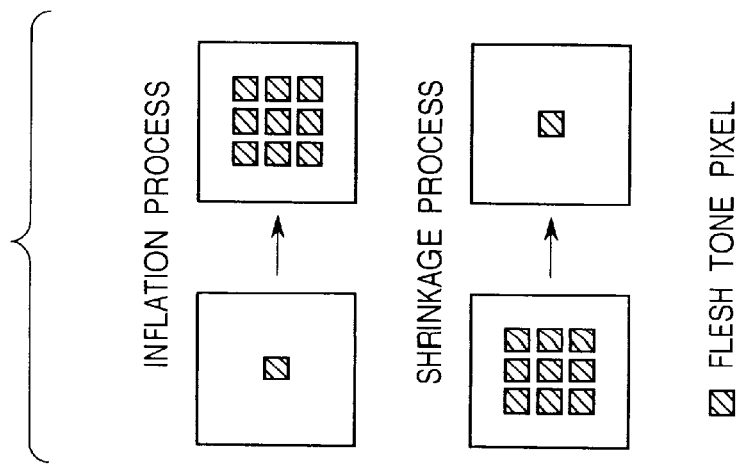

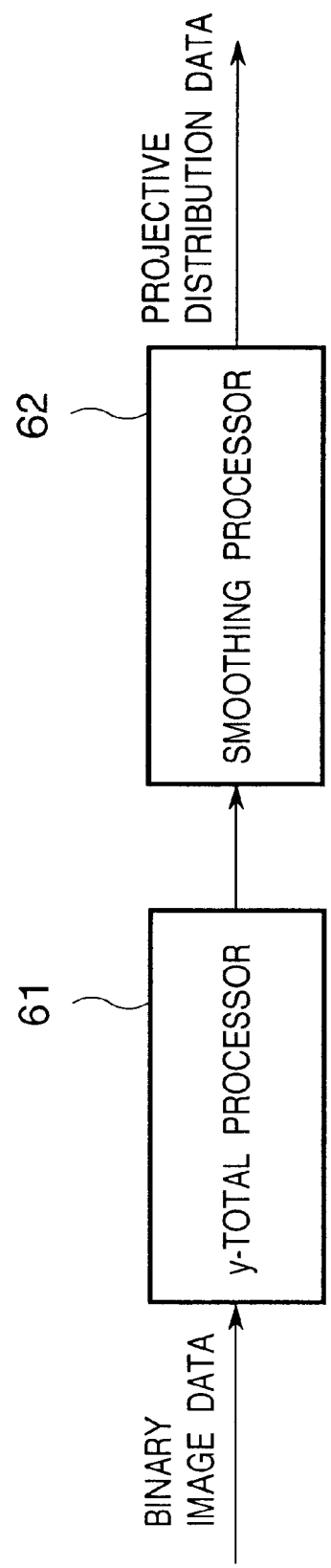

POINT SEQUENCE : VERTEX TO BE SEARCHED
SOLID CURVE : PARABOLA

☒ : PIXEL THAT UNDERGOES
GRADATION PIXEL VALUE L

ADJUSTMENT OF SEARCH REGION

FINE ADJUSTMENT OF RIGHT
AND LEFT ENDS OF CLUSTER

IMAGE PROCESSING METHOD, FACIAL REGION EXTRACTION METHOD, AND APPARATUS THEREFOR

BACKGROUND OF THE INVENTION

The present invention relates to recognition of a specific object from a color image.

As important clues that help extract the facial region of a person from a two-dimensional image, three kinds of information, i.e., motion, color, and shape can be used, and some schemes based on such information have been proposed.

As a facial region recognition scheme using motion, Turk et al. have proposed a scheme for extracting a "face space" defined by eigenvectors obtained by the KL transform of a facial image from an image (Matthew A. Turk and Alex P. Pentland, "Face Recognition Using Eigenfaces", Proc. IEEE Computer Soc. Comf. on Computer Vision and Pattern Recognition, PP. 586–591, 1991). However, with this method, not only the background is contained as a facial region but also the number of persons that can undergo extraction is small. On the other hand, Kimura et al. have proposed a scheme using difference information between flesh tone information and color information of background (Kimura, Kato, and Iguchi, "Tracking of Face Image using Skin Color Information", the Technical Report of the Institute of Electronics, Information and Communication Engineers, HIP96-12, pps. 65–70, 1996). With this scheme, a facial region is stably extracted at high speed. However, these schemes as well as that by Turk et al. are premised on moving image data, and cannot be used in extraction from a still image.

As a facial region extraction scheme using color information in a still image, Dai et al. have proposed a scheme for extracting a facial region by classifying a face pattern and other textures by an SGLD matrix used as an index for expressing texture information of density images (Y. Dai and Y. Nakano, "Face-texture model based on SGLD and its application in face detection in a color scene", Pattern Recognition, vol. 29., no. 6, pp. 1007–1017, 1996). However, this scheme can only cope with full faces captured from ways and requires a large computation volume. On the other hand, Wu et al. have proposed a scheme for extracting a facial region by fuzzy pattern matching by extracting a probable facial region on the basis of distribution models of skin and hair colors in a Farnsworth's uniform perceptual space (Wu, Chen, and Yachida, "Face Detection from Color Images by Fuzzy Pattern Matching", the translations of the Institute of Electronics, Information and Communication Engineers D-II, Vol. J80, no, 7, pp. 1774–1785, 1997). Color information of a face is the most important clue upon extracting a facial region at high speed, but cannot solely realize accurate extraction due to large influences of chromatic components of background.

As a scheme using shape information, Hagiwara et al have proposed a scheme for searching for a face edge using an ellipse (Yokoo and Hagiwara, "Human Face Detection Method Using Genetic Algorithm", the transactions of the Institute of Electrical Engineers of Japan 117-C, 9, pp. 1245–1252, 1997). In this scheme, a plurality of facial regions can be detected, but an ellipse requires five parameters, resulting in a long search of time.

As another scheme using shape information, a scheme that pays attention to the density pattern itself of a facial region is available. Hara et al. have proposed a scheme for face template matching based on a genetic algorithm (Hara and Nagao, "Extraction of facial regions of arbitrary directions from still images with a genetic algorithm", the Technical Report of the Institute of Electronics, Information and Communication Engineers HCS97-12, pp. 37–44, 1997). However, this method is vulnerable to the influences of background, and detection is hard to attain in case of a complex background.

Furthermore, Yang et al., Juell et al., Ito et al., and Lin et al. have respectively proposed schemes for searching for the density pattern of a face by a neural network (Guangsheng Yang and Thomas S. Hung, "Human Face Detection in a Complex Background", Pattern Recognition, vol. 27, pp. 53–63, 1994; P Juell and R. March, "A hierarchical neural network for human face detection", Pattern Recognition, vol 29, no. 6, pp. 1017–1027, 1996; Ito, Yamauchi, and Ishii, "Face Image Extraction from a picture by a detecting features of attentive regions of artificial neural network", the Technical Report of the Institute of Electronics, Information and Communication engineers NC96-200, pp. 347–453, 1997–03; S. H. Lin and S. Y. Kung, "Face recognition/detection by probabilistic decision-based neural network", IEEE Trans. Neural Networks, vol 8, no. 1, pp. 114–132, 1997). However, these extraction schemes based on shape information allow accurate alignment but require a long detection time resulting from troublesome computations.

SUMMARY OF THE INVENTION

The present invention has been made in consideration of the conventional problems and has as its object to provide a method and apparatus for accurately detecting the facial region of a person from a color image at high speed.

It is another object of the present invention to provide an image processing method for extracting a specific object from a color image at high speed.

In order to achieve the above objects, the present invention comprises the following arrangement.

That is, a facial region extraction method for extracting a facial region of a person from a color image, comprises:

the detection step of detecting a flesh tone region;

the generation step of generating a projective distribution of the detected flesh tone region;

the search step of searching the generated projective distribution for a parabola;

the extraction step of extracting a facial region candidate from a position of the parabola found by search; and the determination step of determining if the extracted facial region candidate is a facial region.

The detection step preferably uses hue and color difference components, and a region having predetermined hue and color difference components is detected as the flesh tone region.

The search step preferably includes the step of searching for a parabola by a genetic algorithm that matches the projective distribution against the parabola while changing a parameter of the parabola.

The extraction step preferably uses a parabola obtained from a projective distribution in only one axis direction of a coordinate system.

The extraction step preferably uses two parabolas obtained from projective distributions in two axis directions of a coordinate system.

The determination step preferably includes the step of determining if the facial region candidate is a facial region using an aspect ratio of the facial region candidate.

The determination step preferably includes the step of determining if the facial region candidate is a facial region using a neural network that has learned facial patterns in advance.

The neural network preferably has learned face data in a plurality of directions as teacher images.

The determination step preferably includes the step of determining if the facial region candidate is a facial region based on the presence/absence of a hair region in the facial region candidate.

An image processing method for extracting a specific object from a color image, comprises:

the detection step of detecting a specific color region indicating the specific object from a color image; and the recognition step of performing pattern recognition using a genetic algorithm with respect to the detected specific region.

Preferably, the detection step includes the step of detecting a region having a specific shape that indicates the specific object by analyzing the detected specific color region in X- and Y-axis directions, and the recognition step includes the step of performing pattern recognition using the genetic algorithm with respect to the detected region having the specific shape that indicates the specific object.

The method preferably further comprises the step of determining the number of objects to be extracted, and when objects corresponding in number to a value designated in advance have been detected, extraction ends.

The method preferably further comprises the step of determining an extraction processing time, and when a time designated in advance has reached, extraction ends.

The method preferably further comprises the extraction region calculation step of calculating a ratio between a total area of detected objects and an area of an image searched, and when an extraction area ratio has exceeded a value designated in advance, extraction ends.

The recognition step preferably includes the step of replacing a new gene obtained by genetic manipulation by a gene with a highest adaptation level among selected genes when the new gene expresses a position within a region from which an object has already been extracted.

An image processing method for extracting a facial region of a person from a color image, comprises the steps of:

detecting substantially parabolic boundaries with respect to X- and Y-axes, which are formed by an object in a predetermined color, from a color image; and detecting an elliptic region from detection results, and determining the detected elliptic region as a facial region.

The substantially parabolic boundaries are preferably detected by changing at least some of parameters of a parabola and determining parameters with a highest adaptation level as boundaries of the object.

With this arrangement, since candidate regions are extracted by searching for parabolas defined by a small number of parameters, a quick search can be done, and the time required for extracting a facial region can be shortened. Also, since candidates are found by search based only on the color and projective distribution of regions, and it is checked if each candidate region is a facial region, candidates for a facial region can be narrowed down, and the facial region can be quickly extracted.

Furthermore, upon detecting a specific object from a color image, candidates for the object to be detected are narrowed down based on the color of a region, and pattern recognition is made for the candidates, thus allowing quick recognition of an object.

Moreover, upon detecting a facial region, a parabolic region is extracted in the X- and Y-axis directions, and an elliptic region which is likely to be a facial region is detected from the extracted region. Hence, candidates that undergo detection can be narrowed down, and quick facial region detection is achieved. Since candidates are extracted based on a relatively simple figure, i.e., a parabola, they can be extracted quickly.

Since the user sets in advance a threshold value used to end processing, an end condition suitable for an object image to be found can be set, and a search can be ended without wasting time.

Since a plurality of conditions can be set as the end condition, a search repeats itself until specific conditions are satisfied, thus reliably making processing converge.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are views for explaining inflation and shrinkage processes;

FIG. 6 is a block diagram showing the arrangement of a projective distribution generator;

DESCRIPTION OF THE PREFERRED EMBODIMENTS

[First Embodiment]

Figure 1:
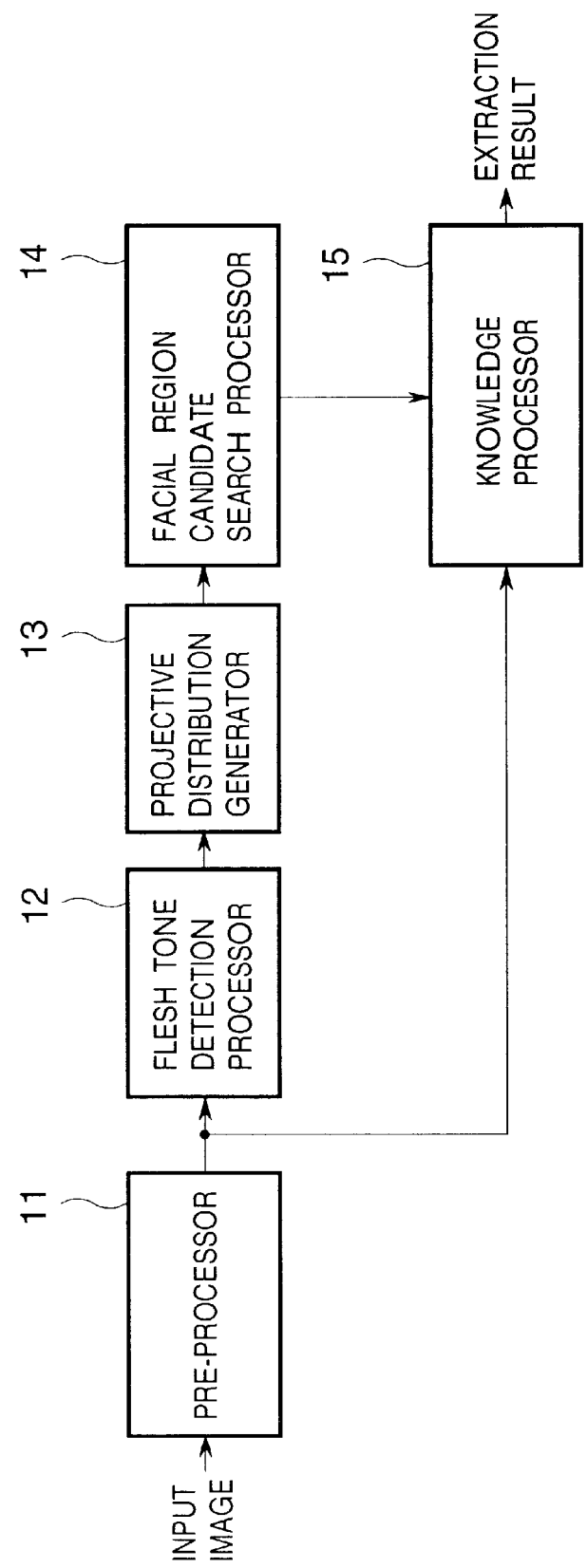
FIG. 1 is a block diagram showing the basic processing arrangement according to an embodiment of the present invention.

The first embodiment of the present invention will be described hereinafter with reference to the accompanying drawings. FIG. 1 is a block diagram showing the basic arrangement of an apparatus that implements facial region extraction according to the present invention. Referring to FIG. 1, a pre-processor 11 executes pre-processes such as a pixel number reduction, luminance adjustment, noise reduction, and the like for facial region extraction. A flesh tone detection processor 12 detects flesh tone pixels from pre-processed image data, and also reduces noise from the detection result. A projective distribution generator 13 obtains the projective distribution of flesh tone pixels on the basis of the flesh tone pixel detection result. A facial region candidate search processor 14 searches for flesh tone cluster regions as a feature of a facial region on the basis of the shape of the projective distribution obtained by the projective distribution generator 13. In this case, facial region candidates are detected by a parabola search and threshold value process based on a genetic algorithm. A knowledge processor 15 checks based on knowledge given in advance by, e.g., a neural network if each of the regions obtained as search results of the facial region candidate search processor 14 is a facial region.

Figure 2:
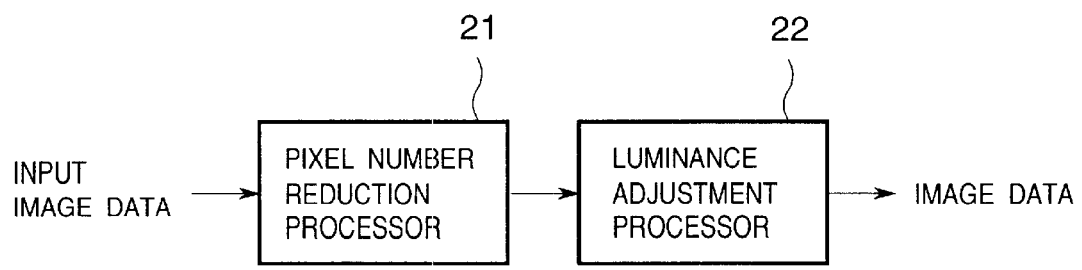
FIG. 2 is a block diagram showing the arrangement of a pre-processor.
Figure 3:
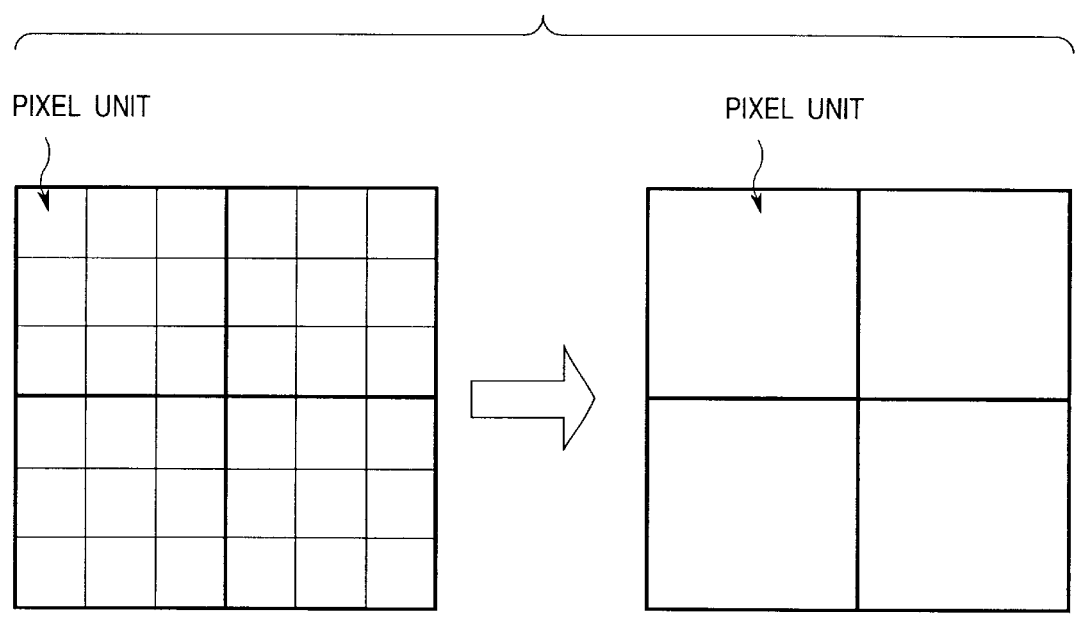
FIG. 3 is a view for explaining a pixel number reduction.

The operations of the principal processors in this embodiment will be described in detail below. FIG. 2 shows the arrangement of the pre-processor 11. A pixel number reduction processor 21 decimates pixel data to achieve high-speed processing as a whole. FIG. 3 shows an example of decimation. In this decimation, a 3×3 pixel block is converted into one pixel having the central pixel value of the pixel block as its pixel value. With this process, the numbers of pixels in the main scan and sub-scan directions are reduced to ⅓.

A luminance adjustment processor 22 corrects the luminance value to remove the influence of a light source. In luminance value correction, red, green, and blue components r, g, and b of one pixel are converted into luminance Y by:

$$Y=0.3r+0.59g+0.11b \quad (1)$$

where Y, r, g, and b are the luminance, red, green, and blue components.

Then, average luminance $Y_{AVE}$ of the entire input image is calculated:

$$Y_{AVE} = \frac{\sum_{i=0}^{WIDTH=1}\sum_{j=0}^{HEIGHT=1} Y(i,j)}{WIDTH \times HEIGHT} \quad (2)$$

where $Y_{AVE}$ is the average luminance of an image, WIDTH is the width of the image, HEIGHT is the height of the image, and Y(i,j) is the luminance value at a coordinate position (i,j).

The average luminance is adjusted by:

$$R=K \cdot r/Y_{AVE},\ G=K \cdot g/Y_{AVE},\ B=K \cdot b/Y_{AVE} \quad (3)$$

where R, G, and B are the red, green, and blue components after luminance adjustment, and K is a luminance adjustment constant.

Note that K is a constant determined depending on the image sensing site. If the average luminance is small, a large value is set; otherwise, a small value is set.

Data r, g, and b undergo luminance correction by computations given by equations (3).

Figure 4:
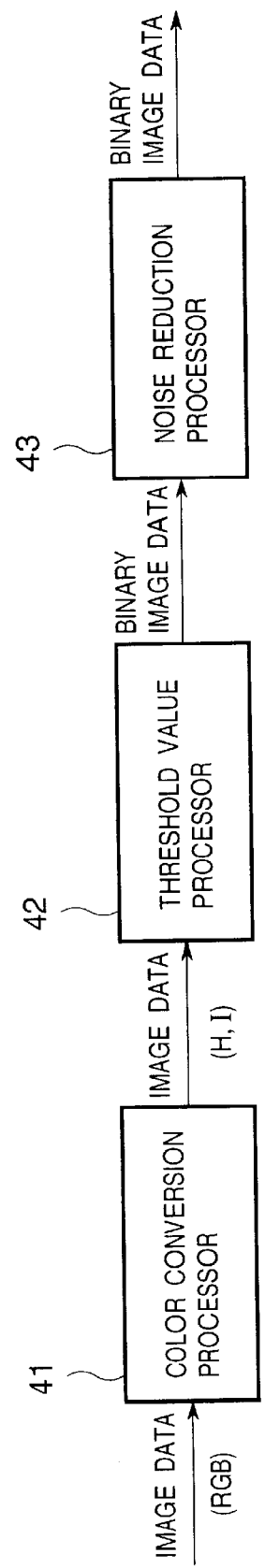
FIG. 4 is a block diagram showing the arrangement of a flesh tone detection processor.

FIG. 4 shows the arrangement of the flesh tone detection processor 12. As is known, flesh tone has specific distributions of hue H in HSV color system and color difference I in YIQ color system. In this embodiment, flesh tone pixels in an image are extracted using H and I. A color conversion processor 41 executes conversions from RGB to H and from RGB to I. RGB data is converted into H data by:

$$H = \left(\frac{180h}{\pi} + 60\right) \times \frac{255}{360} \quad (4)$$

$$h = \begin{cases} \frac{3}{\pi} \cdot \frac{B-R}{\max(R,G,B)-\min(R,G,B)} & : G = \max(R,G,B) \\ \frac{3}{\pi} \cdot \left(2 + \frac{R-G}{\max(R,G,B)-\min(R,G,B)}\right) & : B = \max(R,G,B) \\ \frac{3}{\pi} \cdot \left(4 + \frac{G-B}{\max(R,G,B)-\min(R,G,B)}\right) & : R = \max(R,G,B) \end{cases}$$

Assume that image data is normalized to 256 grayscale levels.

Also, RGB data is converted into I data by:

$$I = \left\{\frac{(0.6R - 0.28G - 0.32B)}{0.6} + 255\right\} \bigg/ 2 \quad (5)$$

Again, assume that image data is normalized to 256 grayscale levels like in H.

A threshold value processor 42 determines pixel positions falling with a predetermined range as flesh tone pixels on the basis of H and I obtained by equations (4) and (5) using:

Flesh tone condition:

$$(H_L < H(i,j) < H_H)\ \&\ (I_L < I(i,j) < I_H) \quad (51)$$

where $H_L$ and $I_L$ are the lower limits of H and I, $H_H$ and $I_H$ are the upper limits of H and I, and H(i,j) and I(i,j) are the H and I values of a pixel (i,j) of interest.

A noise reduction processor 43 reduces noise in the determination result of the threshold value processor 42 using inflation and shrinkage processes. FIGS. 5A and 5B show the inflation and shrinkage processes and their examples. Referring to FIGS. 5A and 5B, the values of flesh tone pixels detected by the flesh tone detection processor 12 are set at 255, and other pixel values are set at 0. Note that flesh tone pixels with pixel values=255 are indicated by black pixels, and other pixels with pixel values=0 are indicated by white pixels in FIGS. 5A and 5B. In both FIGS. 5A and 5B, inflation expands one pixel to a 3×3 pixel block having that pixel as the center, and shrinkage removes pixels other than the central pixel of a 3×3 pixel block in the expanded image.

FIG. 6 shows the arrangement of the projective distribution generator 13. A projective distribution processor 61 calculates a y-total of flesh tone pixels obtained by the flesh tone detection processor 12, i.e., a histogram of flesh tone pixels at the respective points on the x-axis by:

$$f_i = \sum_{j=0}^{HEIGHT=1} (I(i,j)/(HEIGHT \times 255)) \quad (6)$$

Figure 7:
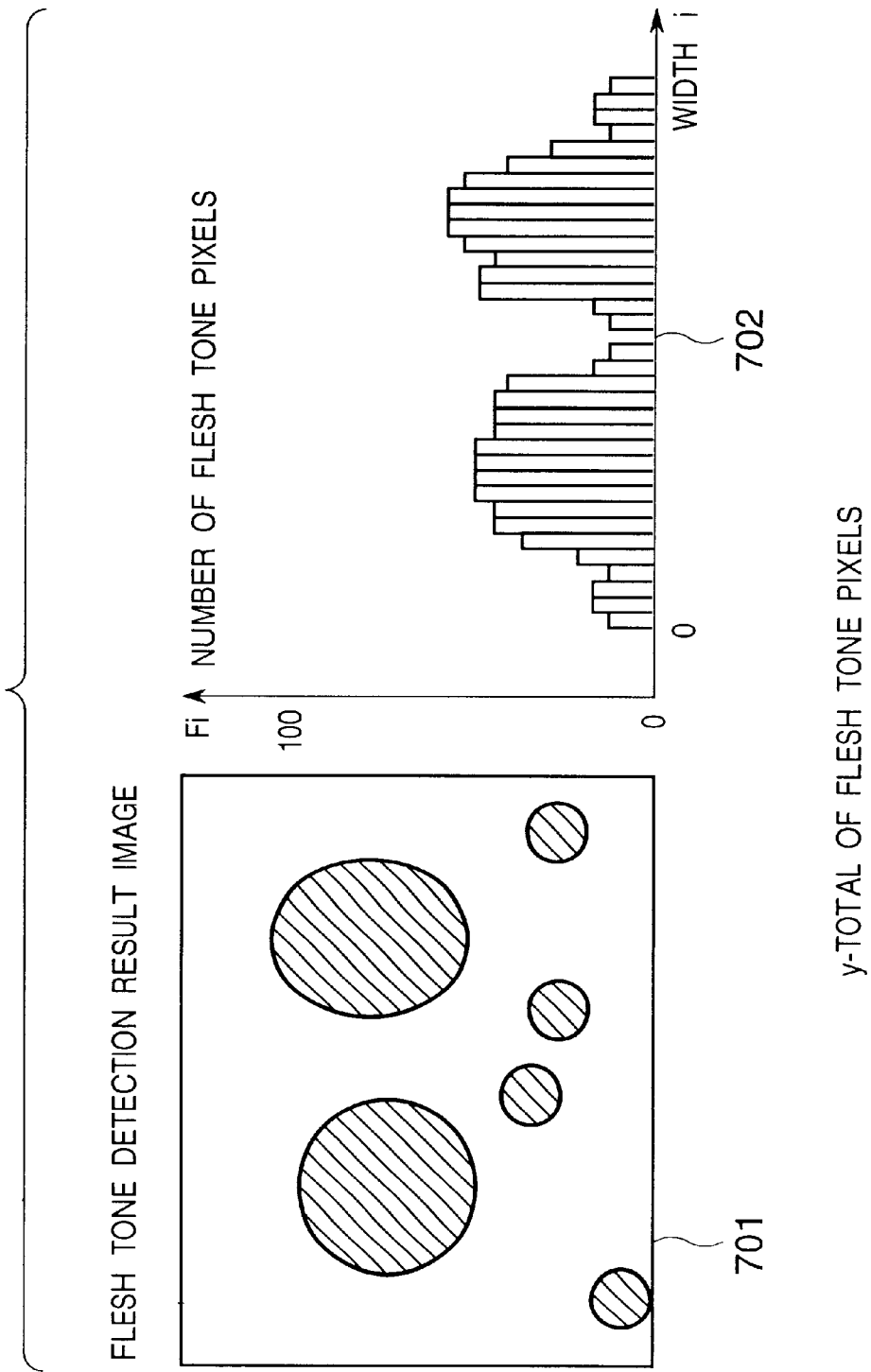
FIG. 7 is a view for explaining a y-total process of flesh tone pixels.

FIG. 7 shows an example of the y-total result of flesh tone pixels. A graph 702 represents the projective distribution of pixels contained in facial region portions (black elliptic shapes) in an image 701, and the distribution forms a parabolic shape. Subsequently, to attain an easy parabola search in the next step, a smoothing processor 62 calculates the flesh tone pixel ratio by smoothing given by:

$$F_i = (2f_i + f_{i+1} + f_{i+2} + f_{i+3} + f_{i+4}) \times 100/6 \quad (7)$$

where $f_i$ is the number of flesh tone pixels at position i on the x-axis, and $F_i$ is the flesh tone pixel ratio at position i on the x-axis.

Figure 8:
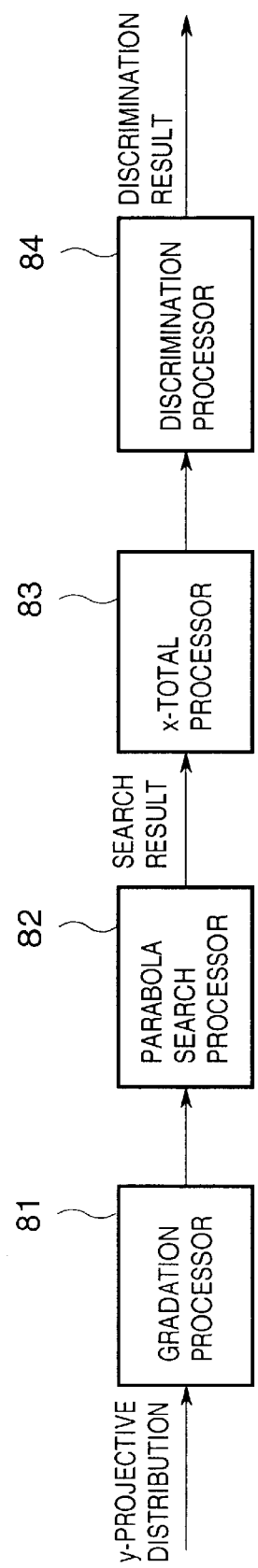
FIG. 8 is a block diagram showing the arrangement of a facial region candidate search processor.

The projective distribution obtained by the projective distribution generator 13 is searched for a cluster of flesh tone pixels by a genetic algorithm and threshold value process. FIG. 8 shows the arrangement of the facial region candidate search processor 14.

The result of the projective distribution generator 13 is searched for a parabola so as to detect the position and width of an objective facial region in the x-axis direction. A parabola can be expressed using three parameters, i.e., slope a and vertex (b, c). A point sequence approximating a parabola expressed by these parameters is defined as:

$$P = \{P_1(x_1,y_1), P_2(x_2,y_2), \ldots, P_n(x_n,y_n)\} \quad (8)$$

Assume that the graph obtained by the projective distribution generator 13 is a binary image which has a black vertex and other white portions. Let $n_w$ be the number of coordinate points corresponding to black pixels in the point sequence P given by equation (8) above. A matching ratio R-between the parabola expressed by the point sequence P at that time, and the graph created as a binary image by the projective distribution generator 13 is defined by:

$$R = n_w/n \quad (9)$$

Figure 9:
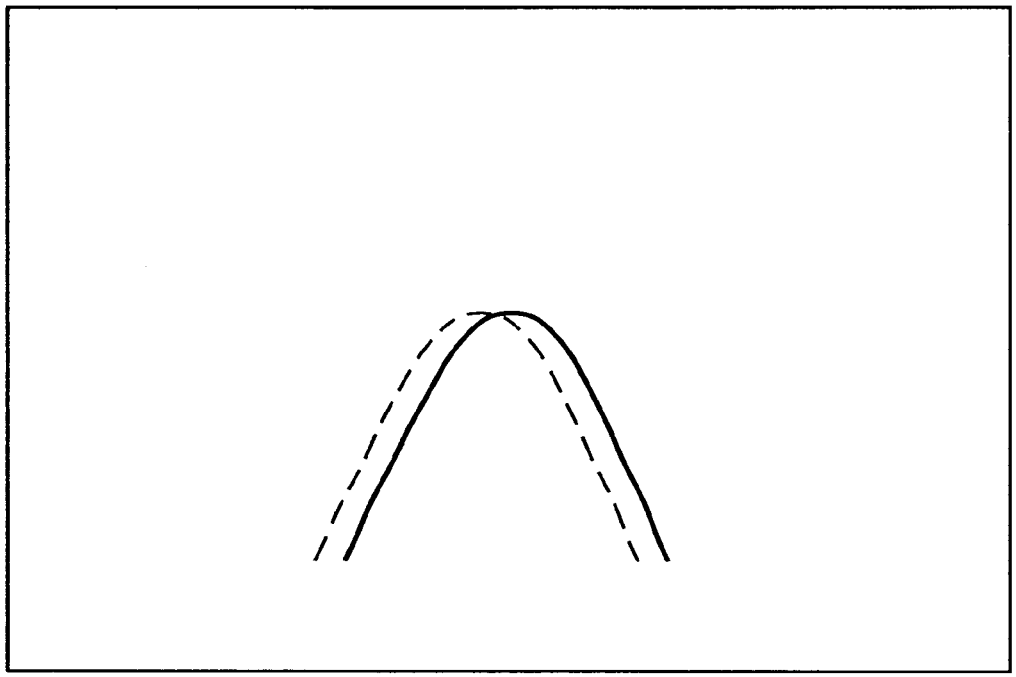
FIG. 9 is a view for explaining the matching process against a parabola.

Upon matching a binary image against a parabola, even when two images slightly shift from each other, as shown in, e.g., FIG. 9, the range of match becomes very small. In this way, when the matching ratio has a sharp peak and the evaluation value distribution in a search space has high discontinuity, it becomes very hard to detect how close the point of interest is with respect to an optimal value.

Figure 10:
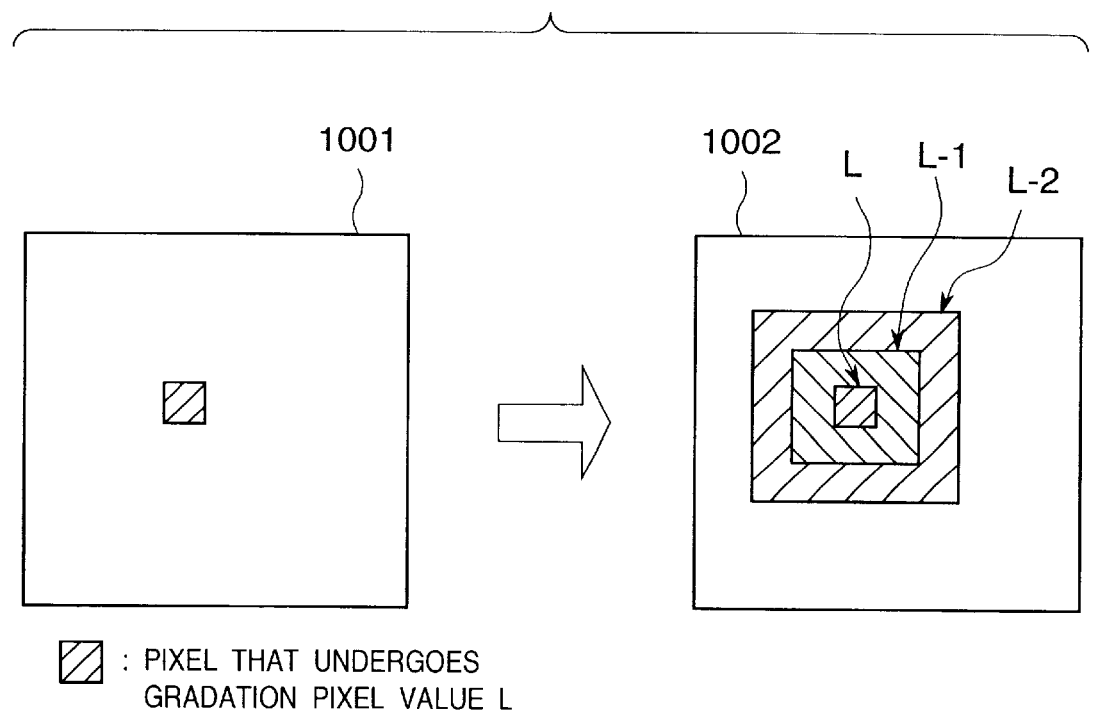
FIG. 10 is a view for explaining multi-value conversion.

Hence, a gradation processor 81 gives gradation to the histogram as an input image to convert the binary image into a multi-valued image. With this conversion, the matching ratio distribution is smoothed, and even when a parabola shifts from an edge image to some extent, a high matching ratio can be assured. In giving gradation, a binary image expressed by black pixels=1 and white pixels=0 is converted into a multi-valued image (L+1 grayscale image) by setting the grayscale value of each black pixel to be L (positive integer) and lowering grayscale values of pixels around that black pixel by unity. FIG. 10 shows an example of the gradation process. Assuming that a black pixel after the gradation-process has a grayscale value L=3, the grayscale value of the central black pixel in an image 1001 is 3, as shown in an image 1002, white pixels at eight neighboring positions of that black pixel have a pixel value=2, and eight-neighboring white pixels around those white pixels have a pixel value=1. As a result of such gradation process, a binary image is converted into a 4 (=3+1) grayscale image.

After the aforementioned gradation process, if a parabola expressed by three parameters form n point sequences $P_k$ expressed by:

$$P_k = \{P_{1k}(x_{1k}, y_{1k}), \ldots, P_{nk}(x_{nk}, y_{nk})\} \quad (11)$$

a matching ratio Match of that parabola is given by:

$$Match = \frac{\sum_{j=1}^{n} f(x_{jk}, y_{jk})}{L \times n} \quad (12)$$

In this equation, $f(x_{jk}, y_{jk})$ represents the grayscale value of the image after the gradation process at a coordinate position $(x_{jk}, y_{jk})$, which grayscale value assumes an integer ranging from 0 to L. If all the vertices of the histogram match points in the parabolic point sequence $P_K$, the matching ratio Match (=[0, 1]) yields 1.

Figure 11:
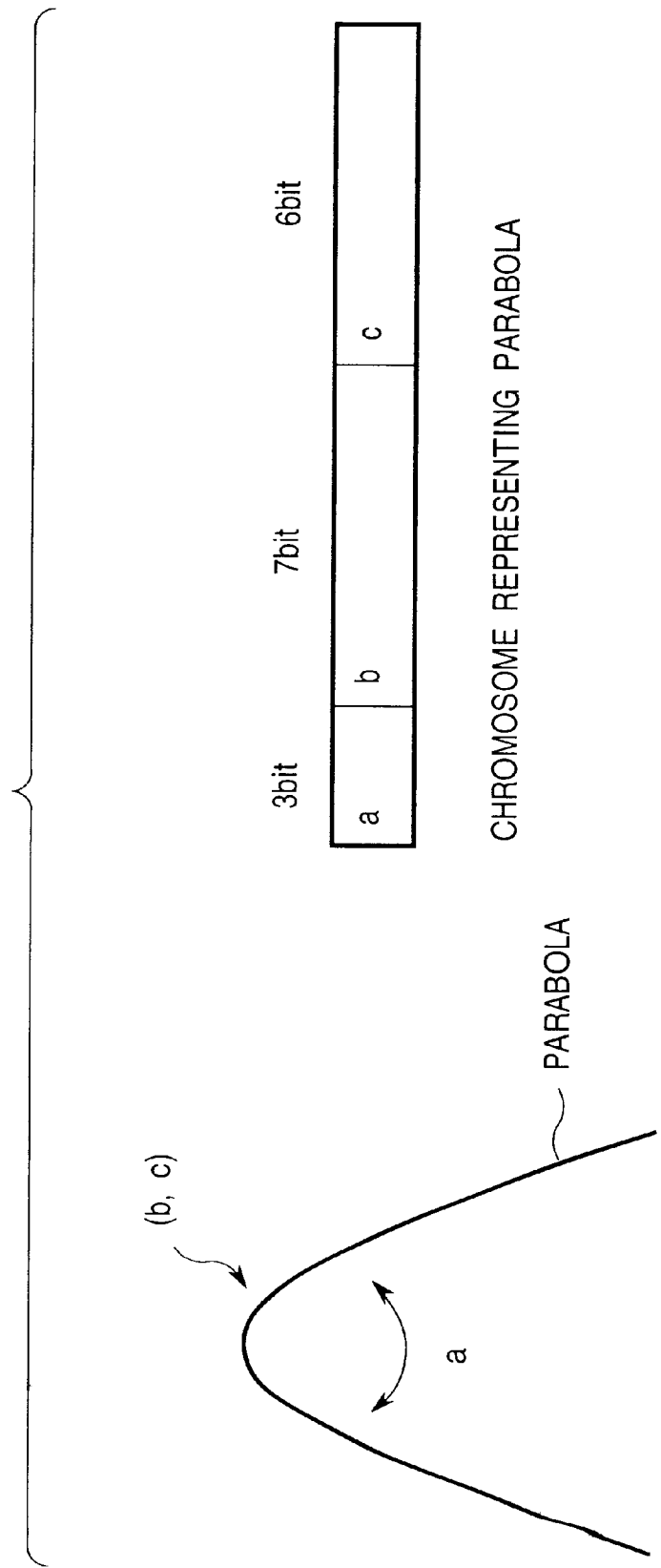
FIG. 11 is a view for explaining interpretation of an individual.

A parabola search processor 82 searches for a parabola using a genetic algorithm. In the genetic algorithm, a chromosome is defined by combining desired parameters, and a chromosome that matches a predetermined condition is sought by variously changing that chromosome according to a predetermined rule. In this embodiment, a chromosome is expressed by three parameters, i.e., slope a and vertex (b, c). FIG. 11 shows the contents of a chromosome. In one chromosome, the slope of a parabola is expressed by 3 bits, and the x- and y-coordinates of a vertex are respectively expressed by 7 bits and 6 bits. As an adaptation level, the function Match defined in the previous paragraphs can be directly used. In this embodiment, a parabola that maximizes the evaluation function Match is searched for by the genetic algorithm using the chromosome shown in FIG. 11.

A process for searching for a parabola by the genetic algorithm is done as follows. That is, initially, the evaluation function Match is evaluated using some different chromosomes (i.e., parameters a, b, and c) prepared randomly. Furthermore, some of the chromosomes with relatively high evaluation function values are left, and a new chromosome is generated by exchanging (crossing over) some bit positions among those chromosomes or inverting (mutating) randomly selected bit positions. The evaluation function is evaluated again using the new chromosome generated in this way. Generation of a chromosome and evaluation repeat themselves, and when, for example, the evaluation function value has exceeded a predetermined threshold value, it is determined that a parabola search has been successful. The chromosome at that time is determined as parameters of the found parabola. The genetic algorithm finds a parabola in this manner.

Figure 12:
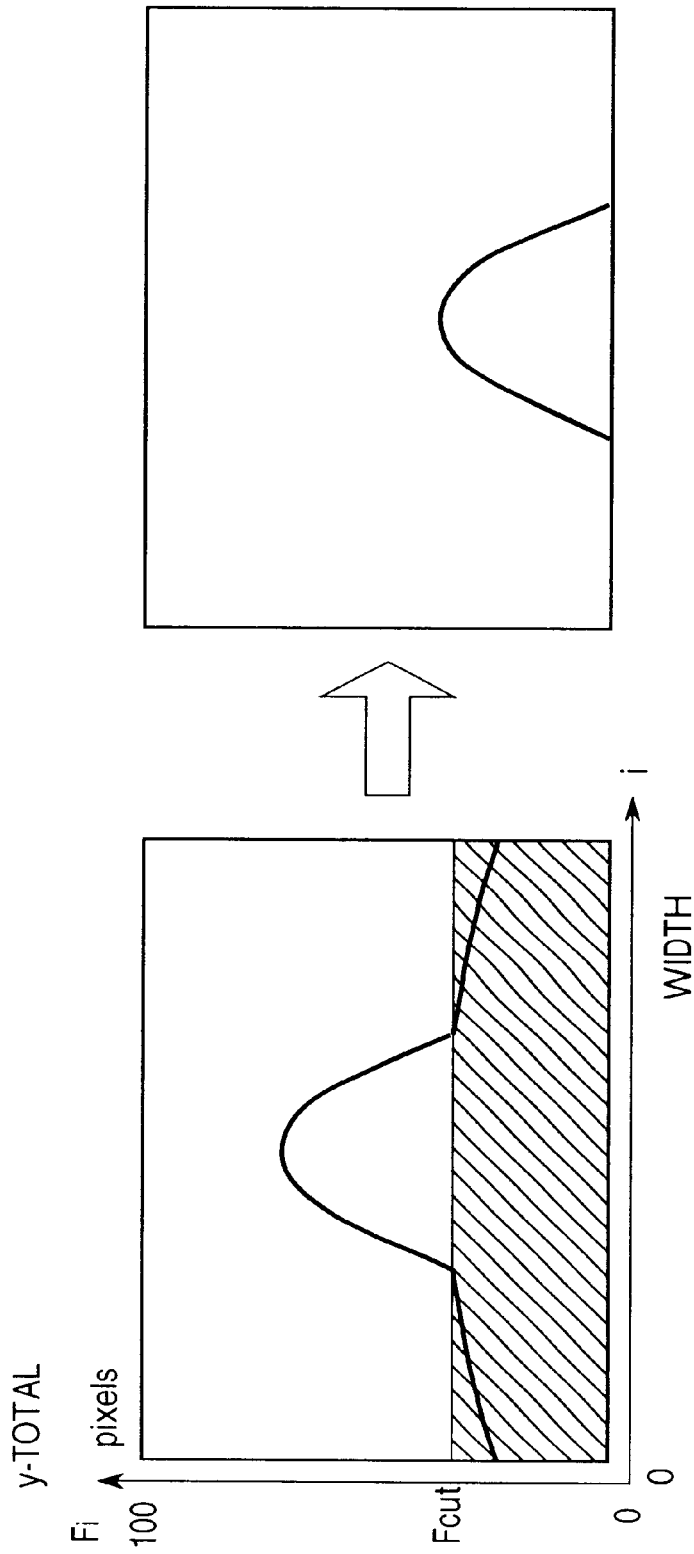
FIGS. 12A and 12B are views for explaining adjustment of a search region.

When the parabola search processor 82 fails to find any parabola, a background or dress may have been detected as flesh tone pixels. In such case, the graph of the projective distribution of flesh tone pixels often has a shape defined by a parabola placed on a smooth base under the influence of the background or dress, as shown in FIG. 12A. Hence, in order to remove such base components, the flesh tone pixel ratio corresponding to the height of the base is subtracted from the y-total by:

$$F_i = F_i - F_{cut} \quad (13)$$

where $F_{cut}$ is the flesh tone pixel reduction ratio.

In this manner, the base components are removed, as shown in FIG. 12B, and the graph is searched again for a parabola.

Figure 13:
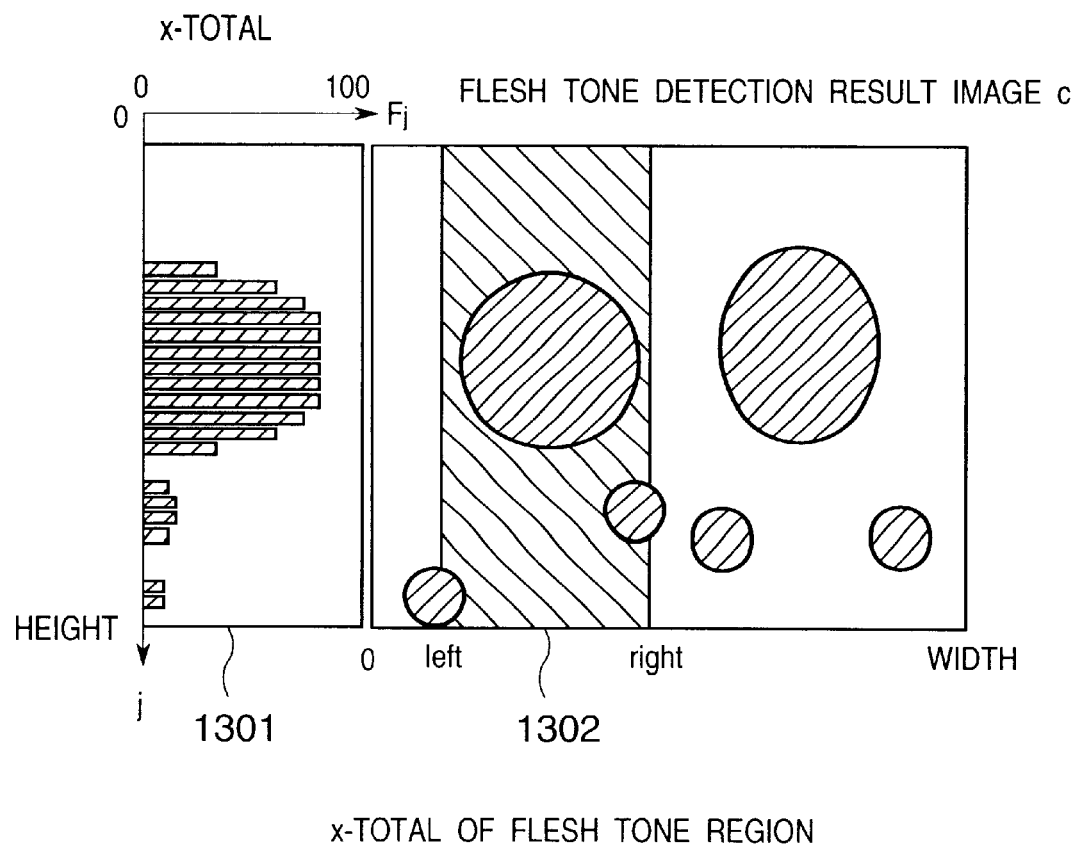
FIG. 13 is a view for explaining an x-axis total process.

An x-total processor 83 defines intersections right and left between the parabola found by the parabola search processor 82 and the x-axis as the right and left ends of a cluster of a flesh tone region, as shown in FIG. 13. In the region (a hatched portion 1302 in FIG. 13) between these ends, the total of flesh tone pixels is calculated in the x-axis direction in turn using:

$$f_j = \sum_{j=L}^{R} (I(i, j)/255) \quad (14)$$

$$F_j = (2f_j + f_{j+1} + f_{j+2} + f_{j+3} + f_{j+4}) \times 100/6$$

where $f_j$ is the number of flesh tone pixels at position j on the y-axis, $F_j$ is the flesh tone pixel ratio at position j on the y-axis, L is the left coordinate position of a cluster, and R is the right coordinate position of the cluster to generate a graph 1301 of their distribution, and the generated graph is smoothed as in the y-total.

Figure 14A:
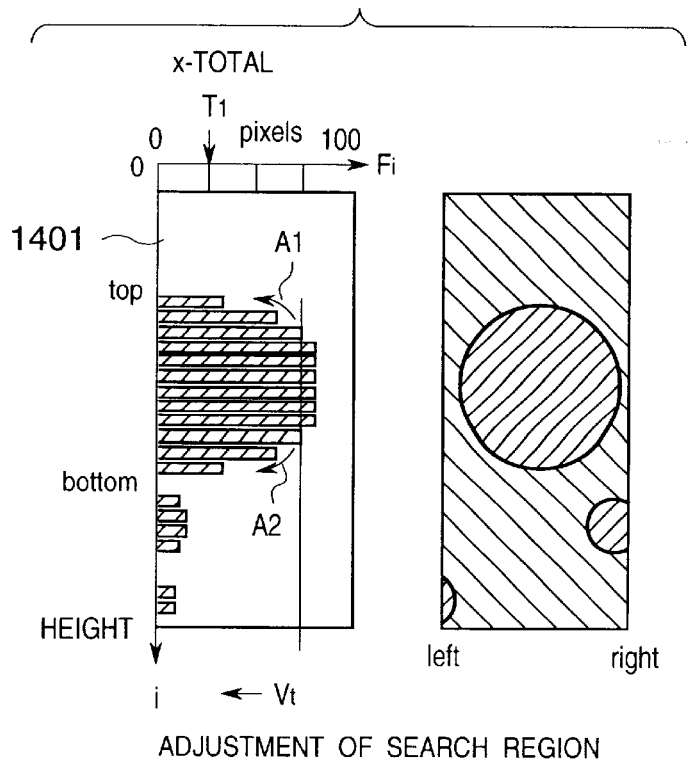
FIGS. 14A and 14B are views for explaining a search for the top and bottom ends and adjustment of the right and left ends of a cluster by a threshold value process.
Figure 14B:
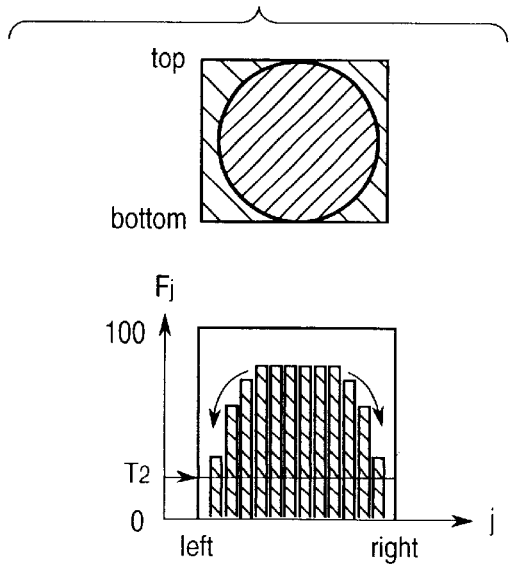

A discrimination processor 84 sets a threshold value Vt in an x-total graph 1401, as shown in FIG. 14A, and top and bottom positions (to be referred to as intersections hereinafter) where the number of pixels has exceeded that threshold value are determined as the top and bottom positions of the cluster of the flesh tone region. If such positions cannot be found, the processor 84 lowers the threshold value to search for the intersections again. The region is broadened upward and downward from the top and bottom positions of the cluster, as indicated by arrows A1 and A2, and when the flesh tone pixel ratio becomes equal to or smaller than T1, intersections at that time are determined as the top and bottom ends of the flesh tone region. Note that the flesh tone pixel ratio is a ratio of flesh tone pixels to those per row, and if all pixels in a row are flesh tone pixels, the ratio=1 (or 100%, as shown in FIGS. 13, 14A, and 14B).

When the ratio of the width between the top and bottom ends of the flesh tone region to the height of the entire image is larger than a predetermined value (e.g., ⅙), the next process is started; otherwise, that region is not determined to be a facial region, and the next flesh tone region is searched.

After the top and bottom ends of the flesh tone region are determined, the width between the right and left ends of the flesh tone region is finely adjusted. The width is finely adjusted by calculating the total of flesh tone pixels with respect to the y-axis in that region again, and estimating positions on the y-axis where the flesh tone pixel ratio is equal to or larger than T2 to be the right and left ends of the flesh tone region, as shown in FIG. 14B.

Figure 15:
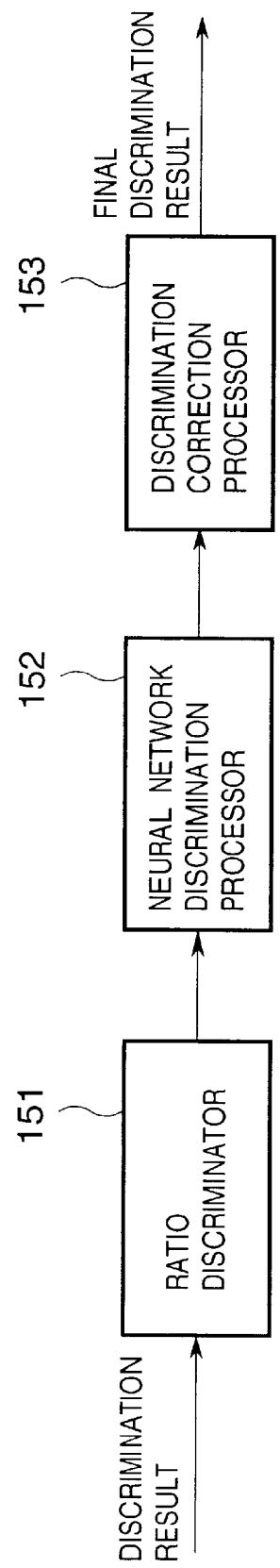
FIG. 15 is a block diagram showing the arrangement of a knowledge processor.

FIG. 15 shows the arrangement of the knowledge processor 15. This processor finally decides if the region detected by the facial region candidate search processor 14 is a face. A ratio discriminator 151 determines that the flesh tone region of interest is not a face when the ratio of the width to height of the detected flesh tone region falls outside a predetermined range. A neural network discrimination processor 152 discriminates by applying neural networks that have learned facial regions in advance to the detected flesh tone region. In this embodiment, faces captured in three directions are coped with using three neural networks, i.e., networks that respectively have learned front-, right-, and left-directing faces. More specifically, when the extracted flesh tone region has one of the learned patterns, it is determined that the region of interest is a facial region. A discrimination correction processor 153 checks if a black portion with a certain size, which corresponds to hair, is located above the detected flesh tone region. If such portion is found, it is determined that the flesh tone region is a facial region, and the detection result of the hierarchical neural networks is corrected. More specifically, even a region which is not determined by the neural network discrimination processor 152 as a facial region is determined as a facial region.

The aforementioned processes are repeated until a predetermined number of faces have been detected or no more parabola is detected, thereby extracting facial regions (positions, widths, and heights) of a plurality of persons from a color still image.

Figure 16:
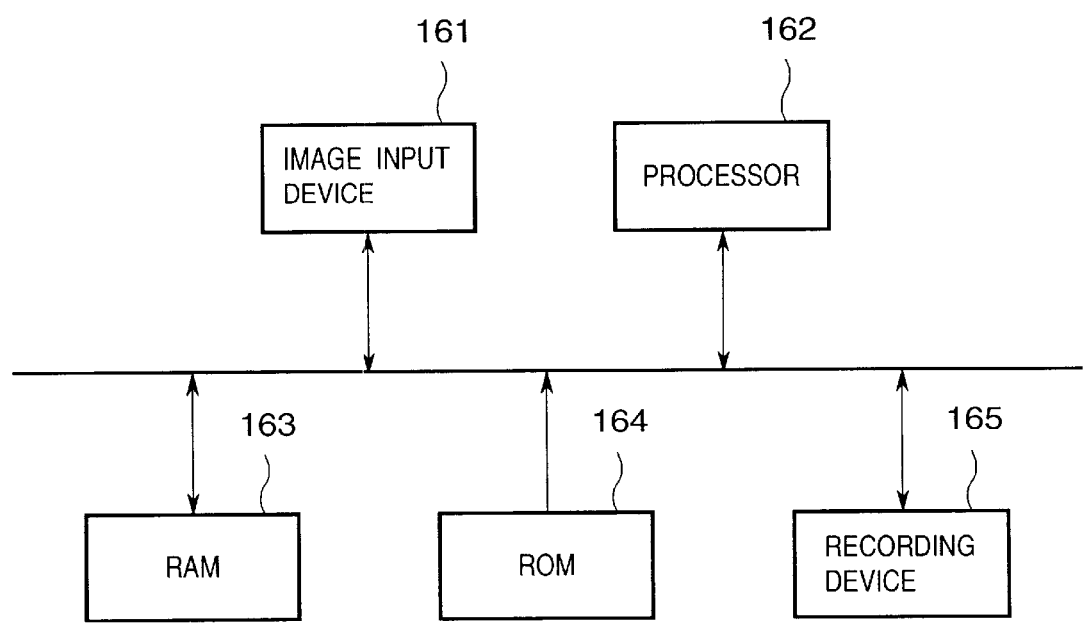
FIG. 16 is a block diagram showing the apparatus arrangement upon implementing the present invention by software.
Figure 17:
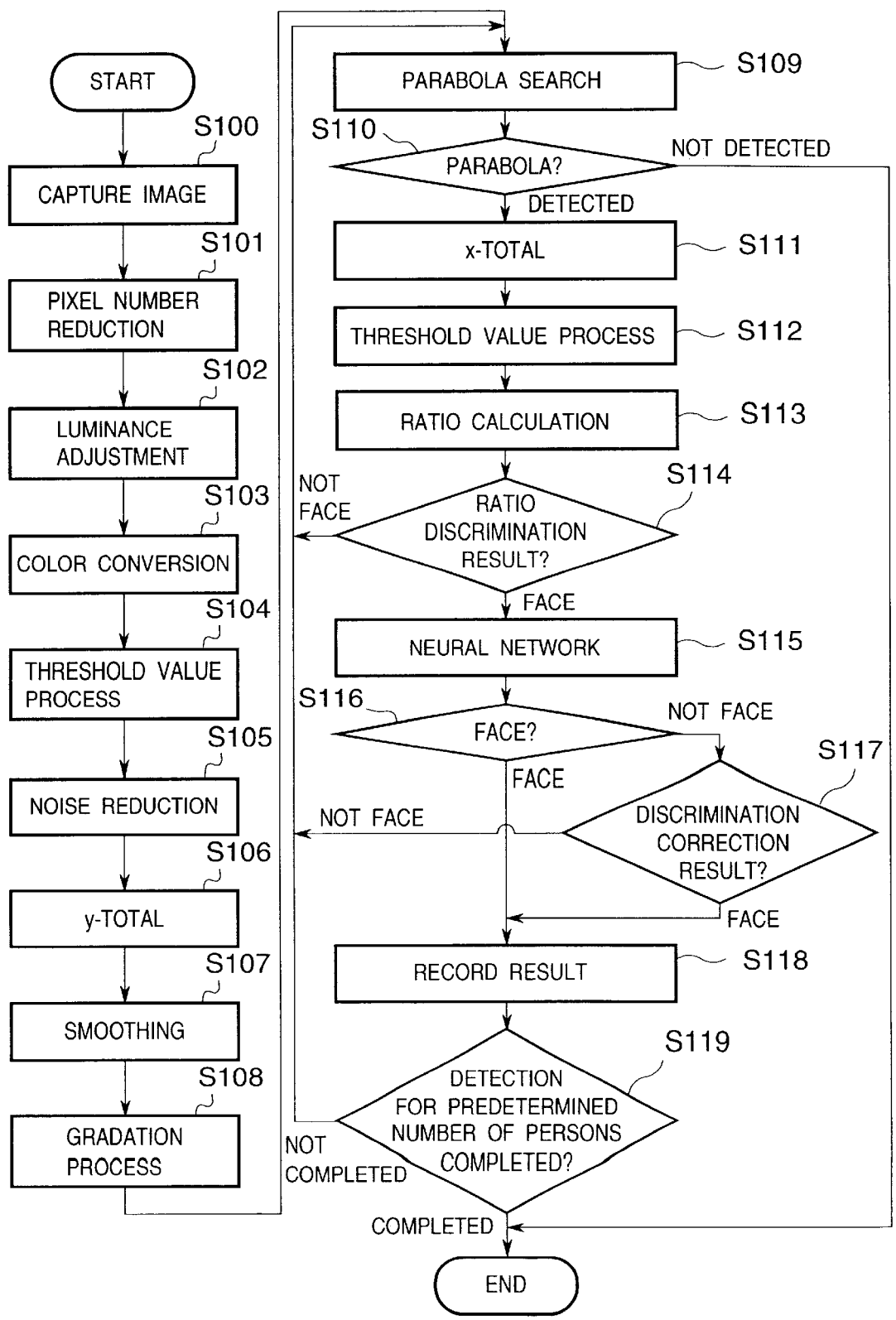
FIG. 17 is a flow chart upon implementing the present invention by software.

FIG. 16 shows an example of the arrangement upon implementing principal processes according to this embodiment by software. An image input device 161 processes capturing, image correction, and the like of image data sensed by, e.g., a CCD camera by hardware. A processor 162 controls principal processes of facial region extraction according to the present invention, and executes various kinds of signal processing by, e.g., a dedicated media processor, DSP (Digital Signal Processor), or the like for multimedia signal processing. A RAM (Random Access Memory) 163 is used as a work memory and various buffer memories of image data required for the operation of the processor 162. The RAM 163 is implemented by, e.g., a fast, large-size memory such as an SDRAM (Synchronous DRAM) or the like. Reference numeral 164 denotes a ROM (Read Only Memory) which stores command programs required for the operation of the processor 162. A recording device 165 stores image data obtained by the image input device and facial region extraction results. The recording device 165 comprises, e.g., a hard disk, and an interface required for I/O. FIG. 17 is a flow chart showing the processing sequence for facial region extraction executed by the processor 162 in the arrangement shown in FIG. 16.

Facial region recognition in this embodiment will be explained below with reference to FIGS. 16 and 17. FIG. 17 also shows the sequence of the processes described above with reference to FIGS. 1 to 14B. Digital image data obtained by the image input device 161 is stored in the RAM 163 in step S100. The processor 162 extracts facial regions from the stored image data. In step S101, the number of pixels of the image data on the RAM 163 is reduced. In step S102, the average luminance is calculated from the image data on the RAM 163 to adjust the luminance.

In step S103, the luminance-adjusted image data is color-converted to generate image data of H and I components and to store them on the RAM 163. In step S104, the H and I components undergo a threshold process to generate bitmap data indicating a flesh tone region and to store it on the RAM 163. In step S105, the flesh tone region bitmap data is inflated and shrunk to remove noise components of small regions. The noise-removed flesh tone bitmap data is stored on the RAM 163 again.

In step S106, a projective distribution in the y-axis direction is generated based on the bitmap data of the flesh tone region. The generated projective distribution is smoothed in step S107. In step S108, the smoothed projective distribution undergoes a gradation process to be converted from binary data into multi-valued data. The multi-valued projective distribution image map is searched for a parabola by the above-mentioned genetic algorithm in step S109. If no parabola is detected as a result of search (step S110), it is determined that there are no facial regions, thus ending the process. If a parabola is detected (step S110), the position and width of a facial region in the x-direction are obtained from the found parabola.

In step S111, the projective distribution in the x-axis direction is calculated from the flesh tone region bitmap data stored on the RAM 163 within only the range detected in step S109. In step S112, the position and range of the flesh tone region in the y-direction as a facial region are calculated from the obtained partial projective distribution in the x-axis direction by a threshold value process. In step S112, the projective distribution in the y-axis direction is calculated within the obtained y- and x-ranges so as to adjust the final position of a flesh tone cluster.

The ratio between the width and height of the facial region is calculated in step S113 with respect to the range of the facial region obtained in step S112, and if it is clearly determined based on that ratio that the extracted region is not a facial region (step S114), it is determined that the region of interest is other than a facial region, and a parabola is searched again. It is checked in step S115 using teacher data learned in advance by the neural networks if the region of interest is a facial region. If it is determined that the region of interest is a facial region (step S116), the position and size of that region are stored in the recording device 165. If it is determined that the region of interest is other than a facial region, the determination result is corrected in step S117. More specifically, an image above the region of interest is checked in step S117, and if the ratio of a black portion is larger than a predetermined ratio, that region is determined to be a facial region. If it is again determined in step S117 that the region of interest is not a facial region, a parabola is searched again. The aforementioned processes repeat themselves until facial regions of a predetermined maximum number of persons are detected (step S119).

When the processor executes the processes shown in FIG. 17, those processes implement the blocks shown in FIG. 1. In this case, the flesh tone detection processor 12 shown in FIG. 1 is implemented by a process including at least step S104 in FIG. 17, the projective distribution generator 13 in FIG. 1 by a process including at least steps S106 and S111 in FIG. 17, and the facial region candidate search processor 14 in FIG. 1 by a process including at least steps S109 and S110, and steps S112 to S117.

With the aforementioned processes, facial regions can be stably detected within the number of persons designated in advance from a color still image at high speed. According to this method, facial regions can be accurately determined on the basis of a color still image at high speed irrespective of their view points or distances without using any inter-frame information of a moving image.

Since a parabola defined by two parameters is used for searching for candidate regions of a facial region, the candidate regions can be found at high speed. Furthermore, since pattern recognition is done after candidate regions are narrowed down, the number of regions to be subjected to pattern recognition can be decreased, thus allowing quick processing.

In the above embodiment, color difference and hue components are used in flesh tone detection. Alternatively, information in other color spaces may be used. Furthermore, a flesh tone region is determined by a simple threshold value process, but may be determined by a more complex scheme.

In the above embodiment, a parabola is detected from the projective distribution generated based on the y-total. Alternatively, a projective distribution based on an x-total may be searched for a parabola depending on the aspect ratio of an image. In the above embodiment, a facial region candidate is extracted from the projective distribution in one axis direction to achieve high-speed processing. However, in order to improve candidate extraction precision, a facial region candidate may be extracted from positions of two parabolas found from projective distributions in two axes.

Figure 18:
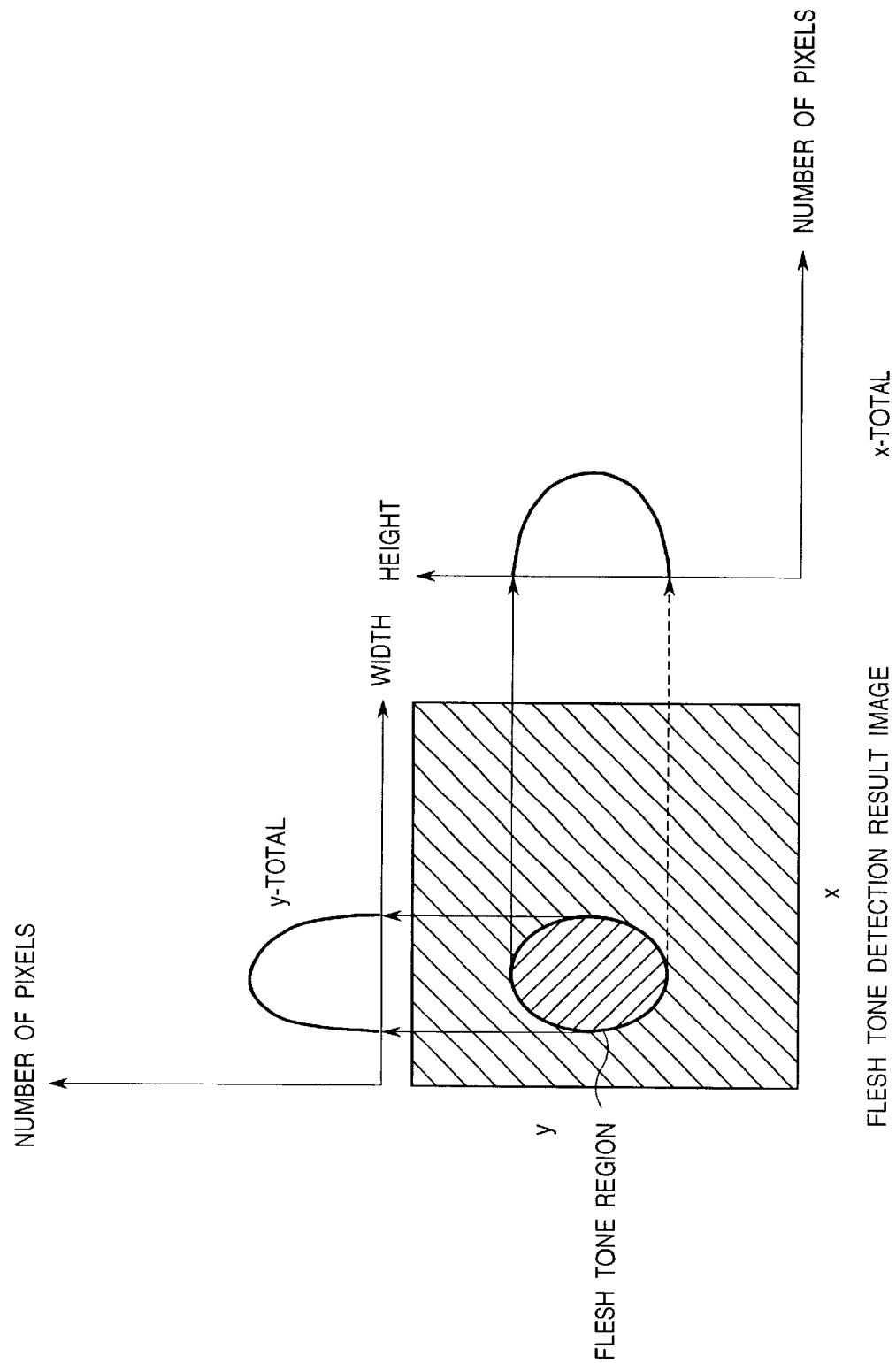
FIG. 18 is a view for explaining another embodiment.

FIG. 18 shows an example of parabola search using projective distributions in two axis directions.

Also, the knowledge process is not limited to a specific one described in the above embodiment, and other conditions may be added.

In this embodiment, the present invention is applied to a still image but may be applied to continuous moving images.

In this embodiment, a facial region of a person is recognized based on a color image. However, the aforementioned method may be applied to a method of recognizing other object regions. In such case, the detection condition used in the flesh tone detection processor may be changed in correspondence with a specific color that represents the feature of an object, and the detection condition (parabola) used in the facial region candidate search processor 14 may be changed in correspondence with a shape that represents the feature of an object, thereby optimizing various conditions in that method in correspondence with the feature of the object.

[Second Embodiment]

Figure 19:
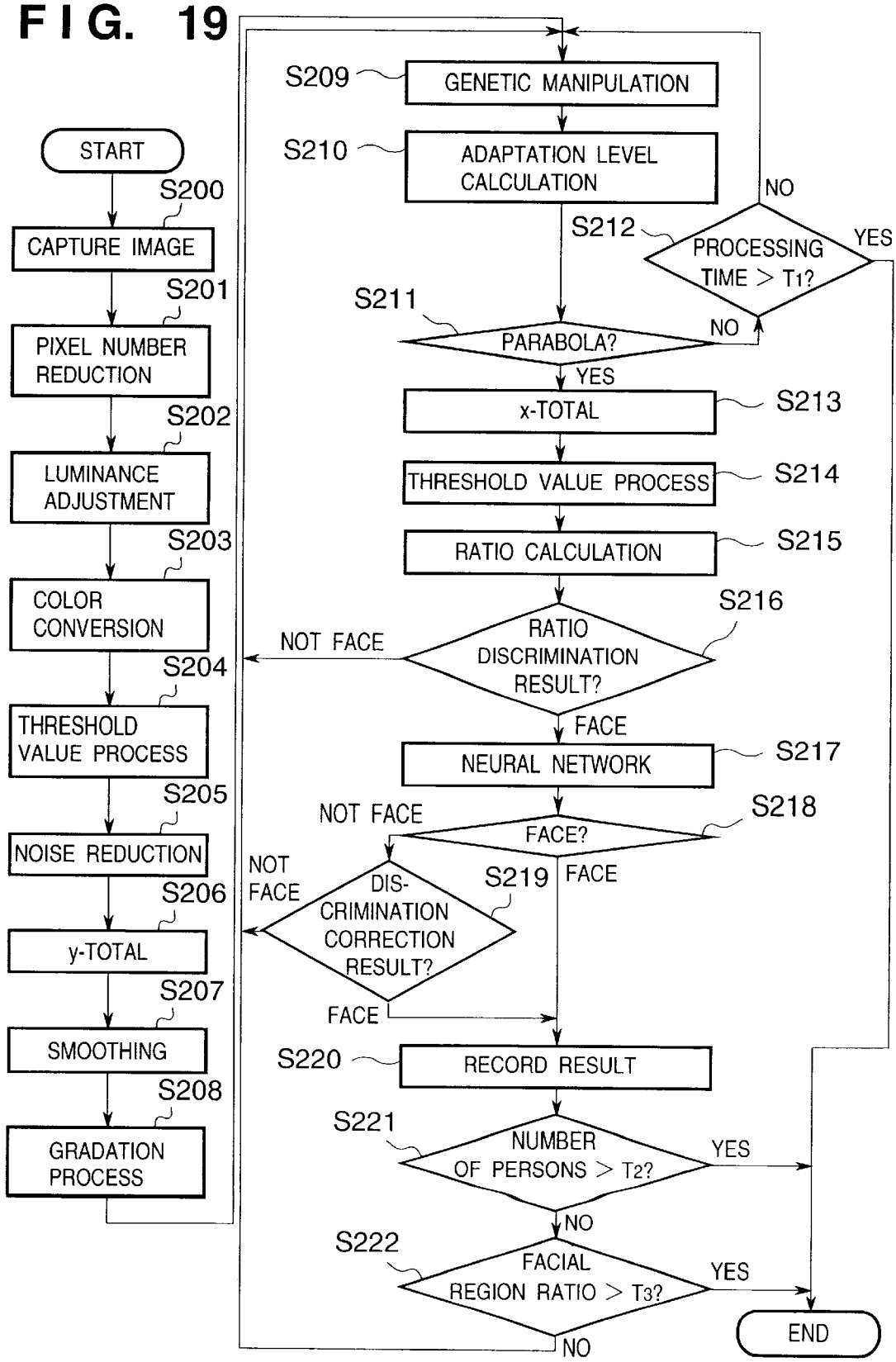
FIG. 19 is a flow chart for explaining the operation of another embodiment.

FIG. 19 is a flow chart showing the sequence for recognizing a facial region from an image according to the second embodiment of the present invention. FIG. 19 shows the operations of software running on hardware shown in FIG. 16. Note that a detailed description of the same steps as those in FIG. 17 in the first embodiment will be omitted.

Steps S201 to S208 are the same as steps S101 to S108 in FIG. 17. Hence, a projective distribution in the y-axis direction is generated based on flesh tone region bitmap data by the processes up to step S208.

In step S209, genetic manipulation for searching the generated projective distribution for a parabola using the genetic algorithm is done. Note that a gene uses slope and vertex coordinate position (b, c) as parameters of a parabola as in the first embodiment. In this embodiment, a group of new genes are generated by selection, crossover, and mutation based on a group of genes one generation before and their adaptation levels. However, when the position of a parabola expressed by a gene generated by selection, crossover, and mutation based on the group of genes one generation before and their adaptation levels corresponds to a region where a facial image has already been extracted, that gene is rejected, and a gene with the highest adaptation level among selected genes is used as a gene of the current generation in place of the rejected gene to proceed the processing. Note that the adaptation level is the matching ratio described in the first embodiment. Also, crossover and mutation are manipulations that have already been described in the first embodiment, and selection means excluding genes with low adaptation levels. If there are no genes one generation before, different combinations of parabola parameters are prepared as initial genes.

Step S210 executes an adaptation level calculation process, i.e., the matching ratio between the parabola expressed by the gene altered in step S209 and an image is calculated as an adaptation level. If it is determined in step S211 that the adaptation level of the gene is equal to or larger than a predetermined value, it is determined that a parabola is detected. If no parabola is detected, the flow returns to step S209 to repeat the processes starting from step S209 until a parabola is detected. In step S212, the time required for those processes is measured, and if the measured time is equal to or larger than a threshold value instructed in advance, the processing ends. The processing time is measured based on the count value of a processing loop counter or an interrupt generated by a timer counter of the processor 162.

If a parabola is detected in step S211, the position and width of a facial region in the x-direction are obtained from the found parabola. In step S213, the projective distribution in the x-axis direction is calculated based on the flesh tone region bitmap data stored in the RAM 163. At this time, the calculation range is limited to the range in the x-direction obtained from the parabola detected in step S211. In step S214, the position and range of the flesh tone region as a facial region in the y-direction are calculated from the obtained partial projective distribution in the x-axis direction by a threshold value process. In step S214, the projective distribution in the y-axis direction is calculated within the obtained y- and x-ranges so as to adjust the final position of the flesh tone cluster.

The ratio between the width and height of the facial region is calculated in step S215 with respect to the range of the facial region obtained in step S214, and is checked in step S216. If it is clearly determined based on that ratio that the extracted region is not a facial region, it is determined that the region of interest is other than a facial region, and a search for a parabola is made again.

It is checked in step S217 using teacher data learned in advance by the neural networks if the region of interest is a facial region. The checking result is discriminated in step S218, and if it is determined that the region of interest is a facial region, the position and size of that region are stored in the recording device 165 in step S220. If it is determined that the region of interest is other than a facial region, the image above the region of interest is checked in step S219, and if the ratio of a black portion is larger than a predetermined ratio, that region is determined to be a facial region. If it is determined in step S219 either that the region of interest is not a facial region, a search for a parabola is made again.

If the facial region extraction result is recorded, the number of detected facial regions is compared with the number T2 of persons set in advance in step S221. If the facial regions beyond the number of persons to be detected have already been detected, the processing ends.

Figure 20:
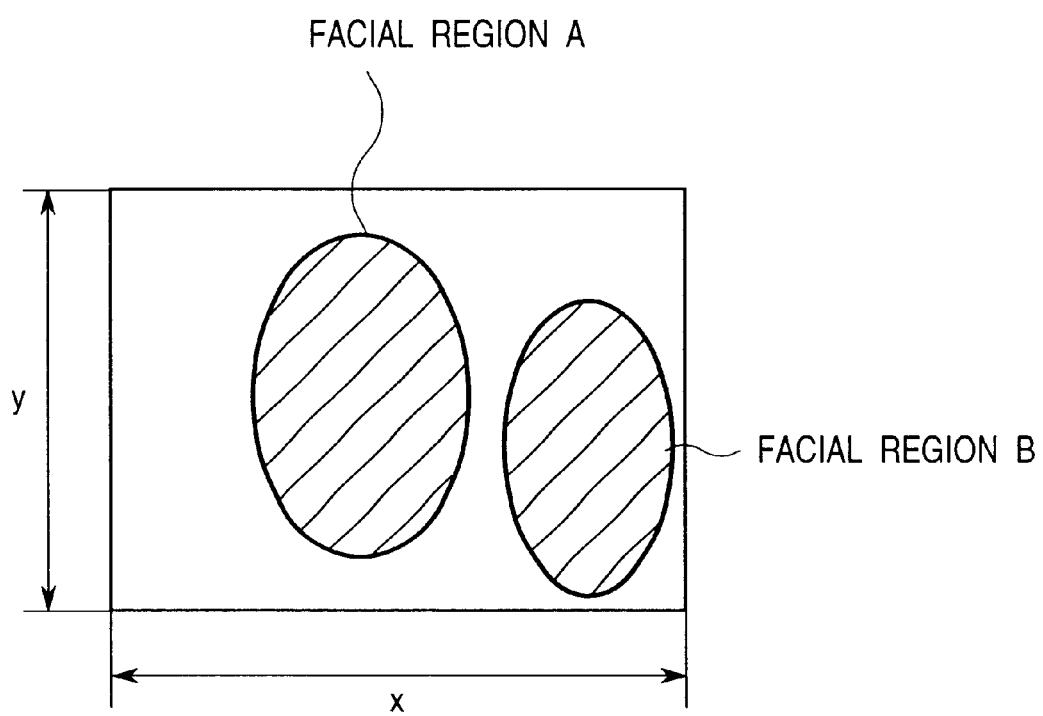
FIG. 20 is a view for explaining a facial region ratio with respect to an image to be searched.

If the number of detected facial regions has not reached the number T2 of persons to be detected, the ratio between the area of the image to be processed and the total value of all detected facial regions is calculated. If the ratio of facial regions has exceeded a pre-set value, the processing ends. FIG. 20 shows an example of the detection process. Let Sa be the area of facial region A, and Sb be the area of facial region B. Then, a facial region ratio r is given by:

$$r=(Sa+Sb)/(x \times y)$$

If the facial region ratio r has exceeded a threshold value T3, the processing ends.

Figure 21:
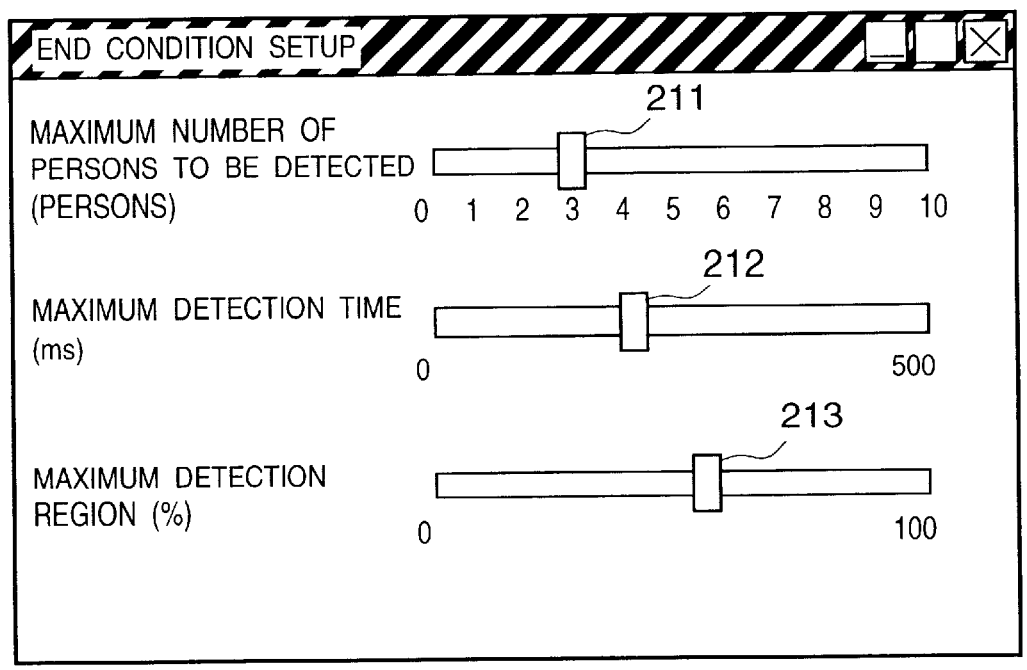
FIG. 21 shows an example of a window used for inputting a facial region search end instruction.

Assume that the threshold values T1, T2, and T3 used as end determination conditions are set before the beginning of execution of step S201. As those pre-set values, fixed values pre-stored in the ROM 164 or the like may be used. Alternatively, when these values are set via a graphical user interface using a display device and a pointing device such as a mouse or the like (neither are shown), the convenience for the user can be improved. FIG. 21 shows an example of a window upon setting these values via the graphical user interface. Referring to FIG. 21, the user moves a slider 211 to the position of the maximum number of persons to be detected using a pointing device or the like. The position of the slider 211 sets the maximum number T2 of persons to be detected. Also, the user moves a slider 212 to the position of a maximum detection time to be set using a pointing device or the like. The position of the slider 212 sets a maximum detection time T1. Furthermore, the user moves a slider 213 to a position of a maximum detection region ratio to be set using a pointing device or the like. The position of the slider 213 sets a maximum detection region ratio T3.

The threshold values T1, T2, and T3 set according to operations on the interface are held in the RAM 163. In steps S212, S221, and S222 in FIG. 19, the threshold values which are set and held in this manner are referred to.

As described above, when a plurality of facial regions are to be extracted by facial region extraction according to this embodiment, since the processing ends with reference to the number of persons detected, processing time, or facial region ratio, any wasteful search process can be avoided, and high-speed processing can be achieved. Upon search based on the genetic algorithm, since a gene that represents an already extracted region is excluded in advance, high-speed processing can be achieved.

Since the threshold values used for ending the processing are set in advance by the user via the graphical user interface, an end condition suitable for an image from which facial regions are to be found by search can be set, and a search can be finished without wasteful searches.

Also, since three different values, i.e., the processing time, the number of persons to be detected, and the facial region ratio can be set as the end condition, a search can be repeated until a specific condition is satisfied, e.g., when the number of persons or the facial region ratio cannot be estimated but only the upper limit of the processing time is to be set, when only the number of persons to be detected can be set, or the like, thus reliably making the processing converge.

In the first and second embodiments, the threshold value in step S104 in FIG. 17 and step S204 in FIG. 19 is changed in correspondence with the flesh tone to be detected, thus detecting various flesh tones. Also, the hair color checked in steps S117 and S219 is not limited to black but various hair colors may be detected, thus extracting facial regions in correspondence with various hair colors.

[Another Embodiment]

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of the sequence shown in FIG. 17 or 19, to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, since a candidate region is extracted by searching for a parabola with a few parameters, quick search can be done, and the time required for extracting a facial region can be shortened. Also, a candidate is retrieved based only on the color and projective distribution of a region of interest, and it is checked if the candidate region is a facial region. Hence, the number of facial region candidates can be decreased, and a facial region can be extracted quickly.

Furthermore, upon detecting a specific object from a color image, candidates for an object to be detected are narrowed down based on the color of a region of interest, and pattern recognition is done for the narrowed-down candidates, thus allowing quick recognition of the object.

Furthermore, upon detecting a facial region, since the region of a parabola is extracted in the x- and y-axis directions, and an elliptic region which is likely to be a facial region is detected from that region, the number of candidates to be detected can be decreased, and a facial region can be quickly detected. Candidates can be quickly extracted since a relatively simple figure, i.e., a parabola is used upon extraction.

Since the user pre-sets a threshold value used upon ending the processing, an end condition suitable for an object image to be searched can be set, and a search can be finished without wasting the search time.

Since a plurality of conditions can be set as the end condition, a search can continue until a specific condition is satisfied, thus reliably making the processing converge.

As many apparently widely different embodiments of the present invention can be made without departing from the spirit and scope thereof, it is to be understood that the invention is not limited to the specific embodiments thereof except as defined in the appended

What is claimed is:

1. A facial region extraction method for extracting a facial region of a person from a color image, comprising:
   a detection step of detecting a flesh tone region;
   a generation step of generating a projective distribution of the detected flesh tone region;
   an obtaining step of obtaining a graph of the projective distribution;
   a search step of searching a parabola corresponding to the graph;
   an extraction step of extracting a facial region candidate from a position of the parabola found by the search; and
   a determination step of determining if the extracted facial region candidate is a facial region,
   wherein said search step includes a step of searching for a parabola by a genetic algorithm that matches the projective distribution against the parabola with changing parameters of the parabola, and
   wherein, at said search step, a slope and a vertex defining a parabola are used as a chromosome in the genetic algorithm and the search of the parabola is performed with crossing over or mutating the chromosome.

2. The method according to claim 1, wherein the detection step uses hue and color difference components, and a region having predetermined hue and color difference component is detected as the flesh tone region.

3. The method according to claim 1, wherein the extraction step uses a parabola obtained from a projective distribution in only one axis direction of a coordinate system.

4. The method according to claim 1, wherein the extraction step uses two parabolas obtained from projective distributions in two axis directions of a coordinate system.

5. The method according to claim 1, wherein the determination step includes a step of determining if the facial region candidate is a facial region using an aspect ratio of the facial region candidate.

6. The method according to claim 1, wherein the determination step includes a step of determining if the facial region candidate is a facial region using a neural network that has learned facial patterns in advance.

7. The method according to claim 6, wherein the neural network has learned face data in a plurality of directions as teacher images.

8. The method according to claim 1, wherein the determination step includes a step of determining if the facial region candidate is a facial region based on the presence/absence of a hair region in the facial region candidate.

9. A facial region extraction apparatus for extracting a facial region of a person from a color image, comprising:
   detection means for detecting a flesh tone region;
   generation means for generating a projective distribution of the detected flesh tone region;
   obtaining means for obtaining a graph of the projective distribution;
   search means for searching a parabola corresponding to the graph;
   extraction means for extracting a facial region candidate from a position of the parabola found by the search; and
   determination means for determining if the extracted facial region candidate is a facial region,
   wherein said search means searches for a parabola by a genetic algorithm that matches the projective distribution against the parabola with changing parameters of the parabola, and
   wherein said search means uses a slope and a vertex defining a parabola as a chromosome in the genetic algorithm and searches the parabola with crossing over or mutating the chromosome.

10. The apparatus according to claim 9, wherein said detection means uses hue and color difference components, and a region having predetermined hue and color difference components is detected as the flesh tone region.

11. The apparatus according to claim 9, wherein said extraction means uses a parabola obtained from a projective distribution in only one axis direction of a coordinate system.

12. The apparatus according to claim 9, wherein said extraction means uses two parabolas obtained from projective distributions in two axis directions of a coordinate system.

13. The apparatus according to claim wherein said determination means determines if the facial region candidate is a facial region using an aspect ratio of the facial region candidate.

14. The apparatus according to claim 9, wherein said determination means determines if the facial region candidate is a facial region using a neural network that has learned facial patterns in advance.

15. The apparatus according to claim 14, wherein the neural network has learned face data in a plurality of directions as teacher images.

16. The apparatus according to claim 9, wherein said determination means determines if the facial region candidate is a facial region based on the presence/absence of a hair region in the facial region candidate.

17. A storage medium storing a program that makes a computer function as:

means for detecting a flesh tone region;

generation means for generating a projective distribution of the detected flesh tone region;

obtaining means for obtaining a graph of the projective distribution;

search means for searching a parabola corresponding to the graph;

extraction means for extracting a facial region candidate from a position of the parabola found by the search; and determination means for determining if the extracted facial region candidate is a facial region, wherein said search means searches for a parabola by a genetic algorithm that matches the projective distribution against the parabola with changing parameters of the parabola, and wherein said search means uses a slope and a vertex defining a parabola as a chromosome in the genetic algorithm and searches the parabola with crossing over or mutating the chromosome.

* * * * *

UNITED STATES PATENT AND TRADEMARK OFFICE
CERTIFICATE OF CORRECTION

PATENT NO. : 6,816,611 B1
DATED : November 9, 2004
INVENTOR(S) : Masafumi Hagiwara et al.

It is certified that error appears in the above-identified patent and that said Letters Patent is hereby corrected as shown below:

Column 1,
Line 19, "Comf." should read -- Conf. --.
Line 43, "from ways" should read -- frontways --.
Line 56, "Hagiwara et al" should read -- Hagiwara, et al. --.
Line 63, "of" should be deleted.

Column 2,
Line 17, "a detecting" should read -- detecting --.

Column 7,
Line 36, "R-between" should read -- R between --.
Line 61, "gradation-process" should read -- gradation process --.

Column 11,
Line 44, "view points" should read -- viewpoints --.

Column 15,
Line 37, "appended" should read -- appended claims. --.

Column 16,
Line 52, "claim" should read -- claim 9, --.

Signed and Sealed this

Fifth Day of April, 2005

JON W. DUDAS
*Director of the United States Patent and Trademark Office*